US010585674B2

(12) United States Patent
Piwonka et al.

(10) Patent No.: US 10,585,674 B2
(45) Date of Patent: Mar. 10, 2020

(54) CONNECTED DEVICES INFORMATION

(71) Applicant: HEWLWTT-PACKARD DEVELOPMENT COMPANY, L.P., Houston, TX (US)

(72) Inventors: Mark A. Piwonka, Houston, TX (US); Michael R. Durham, Houston, TX (US); Nam H. Nguyen, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/078,473

(22) PCT Filed: Aug. 22, 2016

(86) PCT No.: PCT/US2016/048041
§ 371 (c)(1),
(2) Date: Aug. 21, 2018

(87) PCT Pub. No.: WO2018/038703
PCT Pub. Date: Mar. 1, 2018

(65) Prior Publication Data
US 2019/0056959 A1 Feb. 21, 2019

(51) Int. Cl.
*G06F 9/4401* (2018.01)
*G06F 13/12* (2006.01)
*G06F 13/10* (2006.01)
*G06F 7/504* (2006.01)

(52) U.S. Cl.
CPC ............ *G06F 9/4413* (2013.01); *G06F 7/504* (2013.01); *G06F 9/4411* (2013.01); *G06F 13/102* (2013.01); *G06F 13/12* (2013.01); *G06F 13/126* (2013.01)

(58) Field of Classification Search
None
See application file for complete search history.

(56) References Cited

U.S. PATENT DOCUMENTS

| 6,986,035 | B2 | 1/2006 | Stevens et al. |
| 7,415,710 | B1 | 8/2008 | Yan et al. |
| 7,523,338 | B2 * | 4/2009 | Fu ........................... G06F 1/266 |
| | | | 713/300 |

(Continued)

FOREIGN PATENT DOCUMENTS

| WO | WO-03102788 A1 * | 12/2003 | ........... G06F 3/0607 |
| WO | WO-2015117460 A1 * | 8/2015 | ........... G06F 13/385 |

OTHER PUBLICATIONS

'Universal Serial Bus Specification' Revision 2.0, Apr. 27, 2000, pp. 297-298, 334-340, 419, 426-431. (Year: 2000).*

(Continued)

*Primary Examiner* — Steven G Snyder
(74) *Attorney, Agent, or Firm* — HP Inc. Patent Department

(57) ABSTRACT

An example system includes a processor. The system also includes a peripheral interface that includes a controller communicatively coupled to the processor. The controller is to request information from a plurality of devices connected to the peripheral interface prior to the processor requesting the information. The controller is to provide the information to the processor.

18 Claims, 6 Drawing Sheets

(56) References Cited

U.S. PATENT DOCUMENTS

| | | | | |
|---|---|---|---|---|
| 7,688,461 | B2* | 3/2010 | Wise | G06F 3/122 |
| | | | | 358/1.15 |
| 7,984,318 | B2* | 7/2011 | Fu | G06F 1/266 |
| | | | | 455/572 |
| RE44,641 | E | 12/2013 | Ban et al. | |
| 8,713,209 | B2* | 4/2014 | Harris | G06F 9/4413 |
| | | | | 710/11 |
| 9,552,316 | B2* | 1/2017 | Desimone | G06F 9/4411 |
| 9,965,293 | B2* | 5/2018 | Desimone | G06F 9/4411 |
| 10,198,272 | B2* | 2/2019 | Lewis | G06F 9/4411 |
| 2003/0105847 | A1* | 6/2003 | Jennery | G06F 8/65 |
| | | | | 709/223 |
| 2004/0230738 | A1 | 11/2004 | Lim et al. | |
| 2004/0239986 | A1* | 12/2004 | Wise | G06F 3/122 |
| | | | | 358/1.15 |
| 2005/0010746 | A1* | 1/2005 | Chen | G06F 9/4411 |
| | | | | 713/1 |
| 2007/0088967 | A1* | 4/2007 | Fu | G06F 1/266 |
| | | | | 713/340 |
| 2008/0005415 | A1* | 1/2008 | Lopez | G06F 13/385 |
| | | | | 710/62 |
| 2008/0270780 | A1* | 10/2008 | Lopez | G06F 13/385 |
| | | | | 713/1 |
| 2009/0037610 | A1* | 2/2009 | Krancher | G06F 13/102 |
| | | | | 710/10 |
| 2009/0210739 | A1* | 8/2009 | Fu | G06F 1/266 |
| | | | | 713/340 |
| 2010/0180051 | A1* | 7/2010 | Harris | G06F 9/4413 |
| | | | | 710/14 |
| 2012/0054372 | A1 | 3/2012 | Chen et al. | |
| 2012/0265912 | A1 | 10/2012 | Hess et al. | |
| 2013/0132628 | A1 | 5/2013 | Li et al. | |
| 2013/0283371 | A1 | 10/2013 | Sitbon et al. | |
| 2015/0277935 | A1* | 10/2015 | Desimone | G06F 9/4411 |
| | | | | 710/313 |
| 2016/0364243 | A1* | 12/2016 | Puthillathe | G06F 9/4411 |
| 2017/0034315 | A1* | 2/2017 | Vajravel | H04L 69/04 |
| 2017/0109174 | A1* | 4/2017 | Desimone | G06F 9/4411 |
| 2017/0270067 | A1* | 9/2017 | Hu | G06F 13/366 |

OTHER PUBLICATIONS

'Specification of the Bluetooth System' Version 1.1, Feb. 22, 2001. (Year: 2001).*

'Universal Serial Bus Specification' Revision 2.0, pp. 250-254, Apr. 27, 2000. (Year: 2000).*

* cited by examiner

CONNECTED DEVICES INFORMATION

BACKGROUND

When a computer system first turns on, the computer system may boot. The computer system may include a processor that begins executing code stored on a persistent memory, such as a read-only memory (ROM). The computer system may perform power-on self-tests (POST) during the boot. The computer system may also initialize components in the computer system. For example, the computer system may detect and initialize peripheral devices during the boot. During the boot process, the computer system may load a series of boot loaders to initialize the components of the computer system. The computer system may start an operating system and transition control of the computer system from the boot loaders to the operating system.

DETAILED DESCRIPTION

In an example, the computer system may be modular. For example, a plurality of devices may be easily connected to the computer system to provide various functions to the computer system. The connected devices may include a drive, such as an optical disk drive, a hard drive, a flash drive, etc., a communication module, such as a speaker, microphone, etc., input/output devices, or the like. The computer system may include a peripheral interface for connecting to the connected devices. The peripheral interface may be coupled to the connected devices via a peripheral connector, such as a USS connector (e.g., a type A connector, a type B connector, a type C connector, etc.), a Thunderbolt connector, an RJ45 connector, a pogo connector, a custom connector, or the like.

Users of the computer system may desire a fast boot time so that they can begin using the computer system for their intended purpose. For example, a boot time may be 24 seconds or less to perform POST and initialize the components in the computer system. In some examples, communication with the peripheral interface may be slow. For example, the processor may be communicatively coupled to a super input/output (super I/O), which may communicate with the peripheral interface. In an example, the super I/O may be communicatively coupled to the peripheral interface via a system management bus (SMBus). The SMBus may have a data rate on the order of hundreds of kilobits per second or less. Accordingly, any extraneous communications over the SMBus may result in delays in the boot process.

In addition, the peripheral interface may gather the information from the connected devices. The peripheral interface may send messages to the connected devices to detect which connected devices are present and to request the information. The peripheral interface may wait for a response after the peripheral interface requests the information. If the processor is waiting on the peripheral interface to gather the information, such waiting may also result in delays in the boot process. The delays to gather the information and communicate the information over the SMBus may prevent the computer system from achieving the desired boot time.

Figure 1:
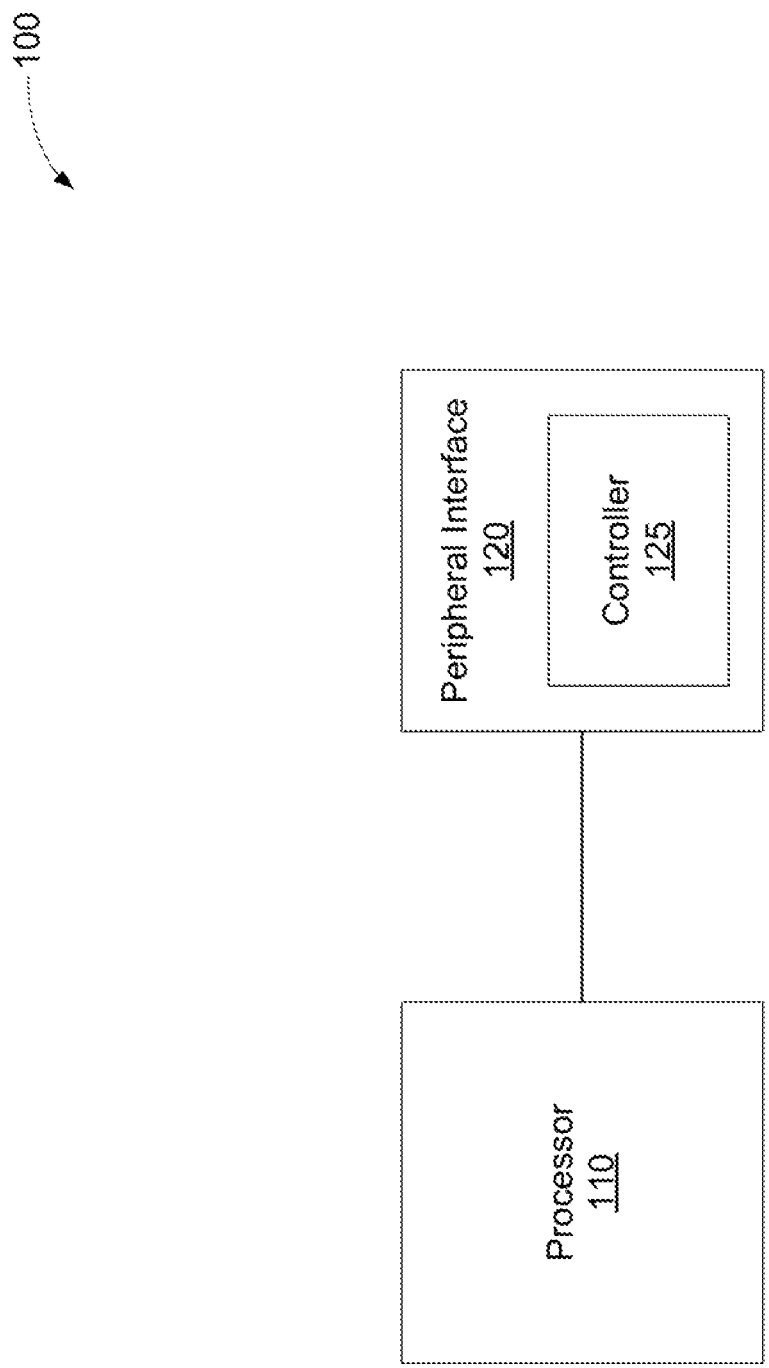
FIG. 1 is a block diagram of an example system to gather information about connected devices.

FIG. 1 is a block diagram of an example system 100 to gather information about connected devices. The system 100 may include a processor 110. The processor 110 may be a general purpose processor or special purpose logic, such as a microprocessor, a digital signal processor, a microcontroller, an application specific integrated circuit (ASIC), a field programmable gate array (FPGA), a programmable array logic (PAL), a programmable logic array PLA), a programmable logic device (PLO), etc. in some examples, the processor 110 may be the central processing unit of a computer system.

The system 100 may also include a peripheral interface 120. The peripheral interface 120 may be communicatively coupled to the processor 110. The peripheral interface 120 may include a controller 125. As used herein, the term 'controller' refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an ASIC, an FPGA, etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The controller 125 may request information from a plurality of devices (not shown) connected to the peripheral interface 120. For example, the plurality of connected devices may be communicatively coupled to the peripheral interface 120 wirelessly or by a wire. The plurality of connected devices may be directly or indirectly coupled to the peripheral interface 120. The controller 125 may request the information prior to the processor requesting the information from the controller 125. For example, the controller 125 may request the information without receiving an indication from the processor 110 to do so. In some examples, the controller 125 may determine that the controller 125 is to request the information without previously communicating with the processor 110. The controller 125 may provide the information to the processor 110. For example, the controller 125 may transmit the information to the processor 110, make the information available to the processor 110, or the like.

Figure 2:
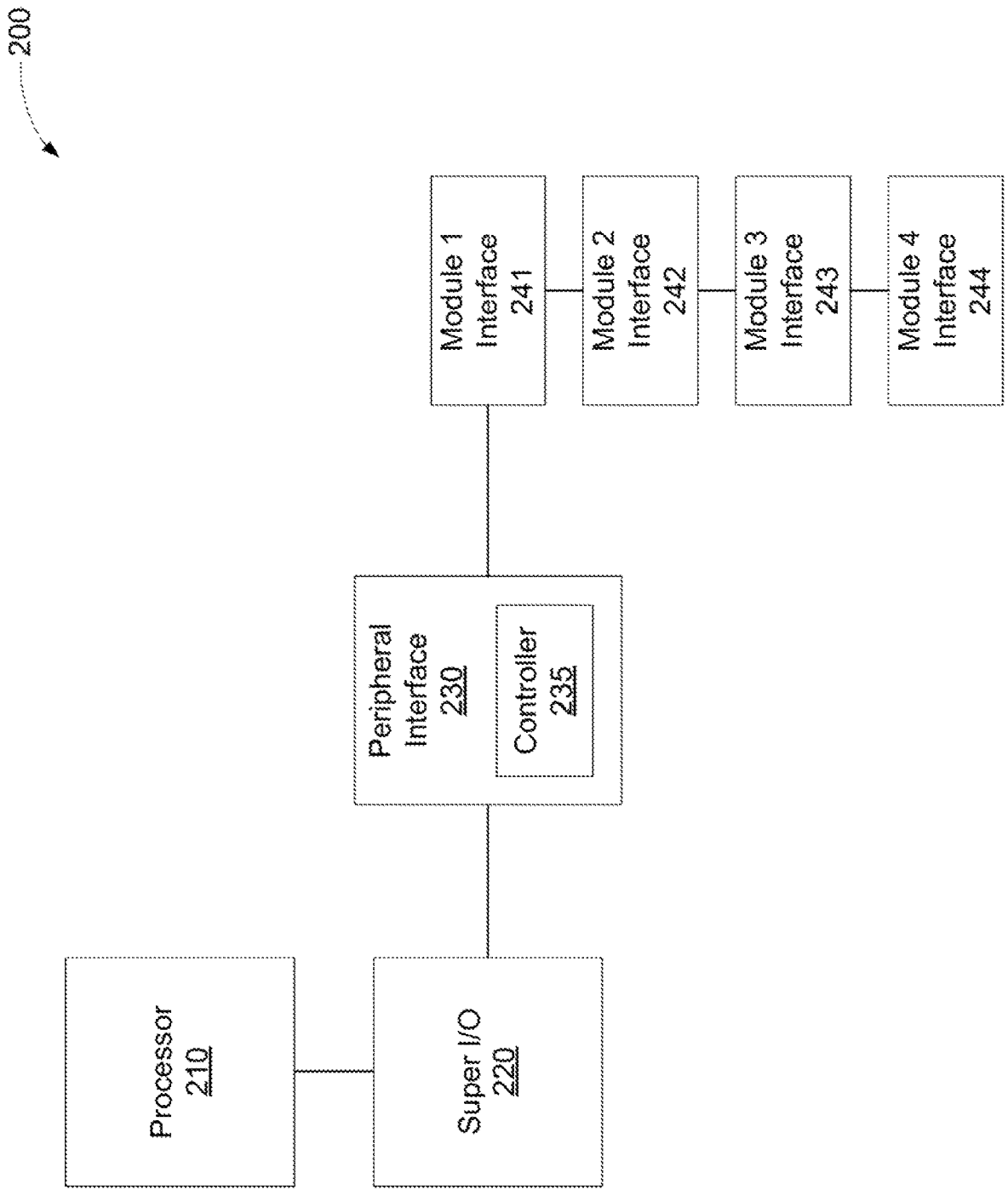
FIG. 2 is a block diagram of another example system to gather information about connected devices.

FIG. 2 is a block diagram of another example system 200 to gather, information about connected devices. The system 200 may include a processor 210. For example, the processor 210 may be a central processing unit. The processor 210 may perform a plurality of boot instructions. The plurality of boot instructions, when executed by the processor 210, may cause the processor 210 to initialize components of the system 200. The system 200 may include a super I/O 220. The super I/O 220 may communicate with low bandwidth devices included in the system 200. The processor 210 may be communicatively coupled to the super I/O 220. The processor 210 may be communicatively coupled to the super I/O 220 via a Northbridge (not shown), a Southbridge (not shown), or the like.

The system 200 may include a peripheral interface 230. The peripheral interface 230 may comprise a controller 235. The super I/O 220 may be communicatively coupled to the controller 235 of the peripheral interface 230. For example, the super I/O 220 may be coupled to the controller 235 via a bus, such as an SMBus or the like. In some examples, the system 200 may also include the plurality of connected devices. Each of the plurality of connected devices may include a module interface 241-241. The module interfaces 241-244 may be communicatively coupled to the peripheral interface 230. The module interfaces 241-244 may be directly or indirectly coupled to the peripheral interface 230 via a wired or wireless connection. In an example, the peripheral interface 230 may be coupled to the module interfaces 241-244 via a peripheral connector, such as a USB connector (e.g., a type A connector, a type B connector, a type C connector, etc.), a Thunderbolt connector, an RJ45 connector, a pogo connector, a custom connector, or the like.

The controller 235 of the peripheral interface 230 may request information from the plurality of connected devices. For example, the controller 235 may transmit the request to the plurality of module interfaces 241-244. In some examples, the controller 235 may also detect which connected devices are present with the request for information. Alternatively, or in addition, the controller 235 may transmit separate messages to detect the connected devices and request their information. In some examples, the controller 235 may request the information over a configuration channel. For example, the peripheral connector may include a data channel for communicating data and a separate configuration channel for communicating configuration information.

The controller 235 of the peripheral interface 230 may request the information from the plurality of connected devices prior to the processor 210 requesting the information. For example, the controller 235 may request the information without receiving an indication from the processor 210 to do so. In an example, the controller 235 may request the information in response to initially receiving power. For example, the controller 235 may determine that the controller has initially received power and not yet requested the information. Based on the determination, the controller 235 may request the information from the plurality of connected devices. The processor 210 may not indicate to the controller 235 that power has been initially received or that the information has not yet been requested. Rather, the controller 235 may determine by itself that power has been initially received and that the information has not yet been requested.

The boot instructions may cause the processor 210 to boot the system 200 and initialize components of the system 200. The controller 235 of the peripheral interface 230 may request the information from the connected devices in parallel with the processor 210 booting the system 200 and initializing components of the system 200. Accordingly, the processor 210 may not wait for the controller 235, or the wait time may be reduced. The controller 235 may request the information before the processor 210 would have been able or ready to instruct the controller 235 to do so. The reduced delay or lack of delay may decrease the boot time and create a better user experience. Once the processor 210 has booted to a state sufficient to retrieve information from the controller, the processor 210 may initialize a system management mode (SMM) handler to gather the information from the controller.

The controller 235 of the peripheral interface 230 may provide the information to the processor 210. For example, the controller 235 may store the information in a storage location accessible to the processor 210. The controller 235 may indicate to the processor 210 that the information is available. For example, the controller 235 may set a status bit indicating that the information is available, trigger an interrupt to the processor 210, transmit an indication the information is available, or the like. The processor 210 may detect that the information is available. For example, the processor 210 may detect that the status bit is set, may receive the interrupt, or the like. In an example, the status bit may, be located at the controller 235 of the peripheral interface 230. The processor 210 may communicate with the controller 235 via the super I/O 220 and the SMBus or the like to read the status bit.

Based on the status bit being set, the processor 210 may retrieve the information about the plurality of connected devices. In an example, the information may be stored at the controller 235 of the peripheral interface 230, so the processor 210 may retrieve the information from the controller 235. The processor 210 may retrieve the information via the super I/O 220 and the SMBus or the like. The controller 235 may store the information in a compressed format, and the information may travel over the SMBus or the like to the processor 210 in the compressed format. Because the information is in the compressed format, it may take less time to transmit over the SMBus or the like, than if the information were not compressed. Accordingly, storing and transmitting the information in the compressed format may reduce the time for the processor to receive the information and to boot the computer.

The processor 210 may retrieve the information about the connected devices one device at a time. After retrieving the information for each device, the processor 210 may determine whether the information indicates that a device is present. In an example, a single bit, such as the first bit, may indicate whether the device is present so that the processor 210 can easily determine whether the device is present. If a device is present the processor 210 may retrieve the information for the next device. If, a device is not present, the processor 210 may not retrieve information for any additional devices. The controller 235 may store the information so that the information for all the devices is adjacent without any gaps between devices. In an example, the controller 235 may store the information for each device in a fixed-size so that the processor 210 can retrieve the information for each device without having to determine what size information to retrieve. Reading the information until the processor 210 detects that a device is not present may reduce the amount of information that is transmitted over the SMBus or the like. Accordingly, the processor 210 may take less time to retrieve the information and to boot the system 200 than if the processor 210 read a data block large enough to hold information for the maximum number of devices that could be connected.

Once the processor 210 has retrieved the information, the processor 210 may analyze the information. In some examples, the processor 210 may determine based on the information that the processor 210 should retrieve additional information about a connected device. The processor 210 may transmit an indication to the controller 235 of the peripheral interface 230 that the controller 235 should request additional information from the connected device.

The controller 235 may request the additional information from the connected device. The connected device may transmit the additional information to the controller 235. In an example, the controller 235 may indicate to the processor 210 that the additional information is available, for example, by setting a status bit, triggering interrupt, transmitting an indication the additional information is available, or the like. The processor 210 may retrieve the additional information based on the indication that the additional information is available. Alternatively, or in addition, the controller 235 may transmit the information to the processor 210 without indicating that the additional information is available. The processor 210 may use the original information and any additional information to initialize the connected devices.

In some examples, an additional device may be communicatively coupled to the peripheral interface 230 after the system 200 has booted or control has been handed over to an operating system. The controller 235 may detect that the additional device has been connected, or example, the controller 235 may detect a load on the peripheral connector, may receive an indication the additional device is present, or the like. The controller 235 may notify the processor 210 that the additional device is present, for example, by setting a status bit, triggering an interrupt, transmitting an indication the additional device is present, or the like. In some examples, the controller 235 may gather information from the additional device and may notify the processor 210 that the information is available when the controller 235 notifies the processor 210 that the additional device is present. Alternatively, or in addition, the controller 235 may notify the processor 210 of the additional device without gathering the information, and the processor 210 may instruct the controller 235 to gather the information. In some examples, the controller 235 may gather and transmit the information to the processor 210 without previously notifying the processor 210 about the additional device. In an example where the controller 235 indicates the information is available, the processor 210 may retrieve the information from the controller 235. In some examples, the processor 210 may request that the controller 235 gather additional information from the additional device. The processor 210 may initialize the additional device based on the retrieved information or additional information.

Figure 3:
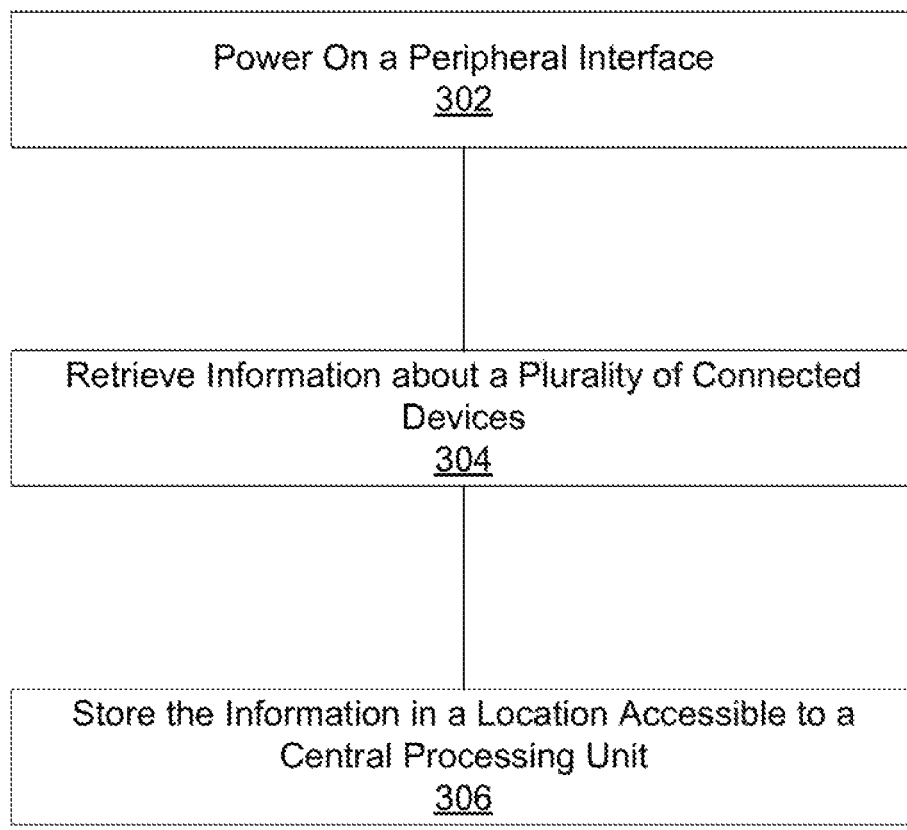
FIG. 3 is a flow diagram of an example method to gather information about connected devices.

FIG. 3 is a flow diagram of an example method 300 to gather information about connected devices. A processor may perform the method 300. At block 302, the method 300 may include powering on a peripheral interface comprising a controller. Powering on the peripheral interface may include the peripheral interface receiving power. Powering on the peripheral interface may include initializing or booting the controller of the peripheral interface.

At block 304, the method 300 may include the controller retrieving information about a plurality of devices connected to the peripheral interface. The controller may retrieve the information based on the powering on of the peripheral interface. For example, the powering on of the peripheral interface may cause the controller to retrieve the information. The controller may retrieve the information without involvement of a central processing unit. For example, the central processing unit may not instruct the controller to retrieve the information. In an example, the central processing unit may not communicate at all prior to the controller retrieving the information.

At block 306, the method 300 may include the controller of the peripheral interface storing the information in a location accessible to the central processing unit. For example, the controller may store the information in a location from which the processor can retrieve the information. In an example, the controller may store the information in the controller, and the central processing unit may be able to retrieve the information from the controller. Referring to FIG. 1, the controller 125, for example, may power on the peripheral interface 120, retrieve the information about the plurality of connected devices, and store the information in a location accessible to the central processing unit.

Figure 4:
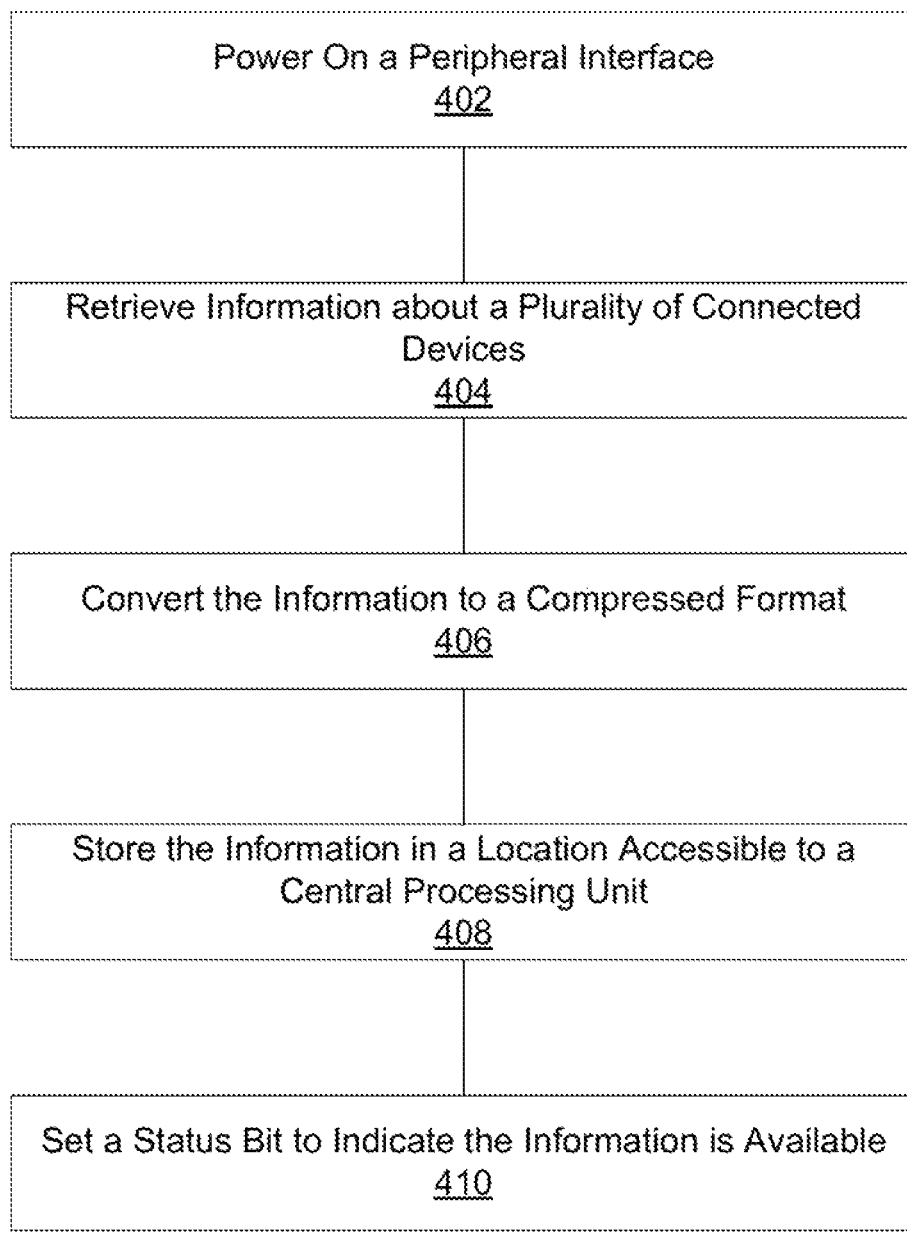
FIG. 4 is a flow diagram of another example method to gather information about connected devices.

FIG. 4 is a flow diagram of another example method 400 to gather information about connected devices. A processor may perform the method 400. At block 402, the method 400 may include powering on a peripheral interface comprising a controller. For example, a user may turn on a computer system comprising the peripheral interface, and the computer system may provide power to the peripheral interface. The peripheral interface may receive the power. In response to receiving the power, the peripheral interface may initialize or boot the controller. Powering on the peripheral interface may include the initializing or booting of the controller.

At block 404, the method 400 may include the controller retrieving information about the plurality of connected devices. The controller may retrieve the information based on or in response to the powering on. For example, the controller may retrieve the information as part of the initialization or boot. Alternatively, or in addition, the controller of the peripheral interface may determine that the controller has just been powered on and retrieve the information based on the determination that the controller has just been powered on. For example, when the controller is powered on, a bit may indicate the information has not been retrieved. The controller may retrieve the information and change the bit to indicate the information has been retrieved. In an example, the controller may retrieve the information once in response to being turned on unless the controller is instructed to request additional information or an additional device is later connected to the peripheral interface.

The controller of the peripheral interface may retrieve the information without involvement of a central processing unit. For example, the controller may rely on itself to determine that the controller has been powered on and that the information should be retrieved. The central processing unit may not indicate to the controller of the peripheral interface that the controller has been powered on or that the controller should retrieve the information. The processor may be booting in parallel with the controller retrieving the information. Accordingly, the controller may be able to retrieve the information before the processor would be ready or able to instruct the controller to do so.

The controller may retrieve the information by transmitting a request for the information to each connected device and receiving a response containing the information. In an example, the controller may transmit the request and receive the response over a configuration channel separate and distinct from a data channel connecting the computer system to each of the connected devices. In some examples, the controller may detect which or how many connected devices are present based on which devices respond to the requests for information. Alternatively, or in addition, the controller may detect the connected devices initially and then request information from the connected devices detected.

At block 406, the method 400 may include converting the information to a compressed format. In some examples, the controller may select a subset of the received information to include in the compressed format of the information. For example, the controller may include information needed by the central processing unit to initialize the connected devices or boot without including information not needed to initialize the connected devices or boot. In an example, the controller may encode portions of the information or the entirety of the information so as to occupy fewer bits. Ire some examples, the information may have a fixed size in the compressed format regardless of the original contents of the information.

At block 408, the method 400 may include the controller storing the information in a location accessible to the central processing unit. The information may be stored in the compressed format. In an example, the controller may store the information in the controller. The controller may arrange the information to optimize transfer of the information to the central processing unit. For example, the controller may store the information in storage locations adjacent to each other. The storage may not include gaps for devices that are not present. Accordingly, the central processing unit may read the information for the connected devices until an empty storage location is encountered or information for the maximum number of possible devices has been read. In some examples, the information for each connected device may include a bit indicating whether a device is present so that the central processing unit can quickly check whether each storage location includes information for a connected device.

At block 410, the method 400 may include the controller setting a status bit to indicate to the central processing unit that the information is ready to be read. Setting the status bit may include the controller indicating to the central processing unit that the status bit has been set. For example, the controller may transmit an indication the information is ready to be read, trigger an interrupt, or the like. Alternatively, or in addition, the controller may set the status bit at the controller and wait for the central processing unit to read the status bit. The central processing unit may check the status bit once the central processing unit is ready to do so. If the status bit is not set, the central processing unit may continue to check the status bit (e.g., periodically) until the status bit is set. Once the central processing unit determines that the status bit is set, the central processing unit may read the information from the controller. The controller may transmit the information to the central processing unit in the compressed format when the central processing unit reads the information from the controller. In an example, the controller 235 of FIG. 2 may power on the peripheral interface 230, retrieve the information about the plurality of connected devices, convert the information to the compressed format, store the information in the location accessible to the processor 210, and set the status bit to indicate the information is available.

Figure 5:
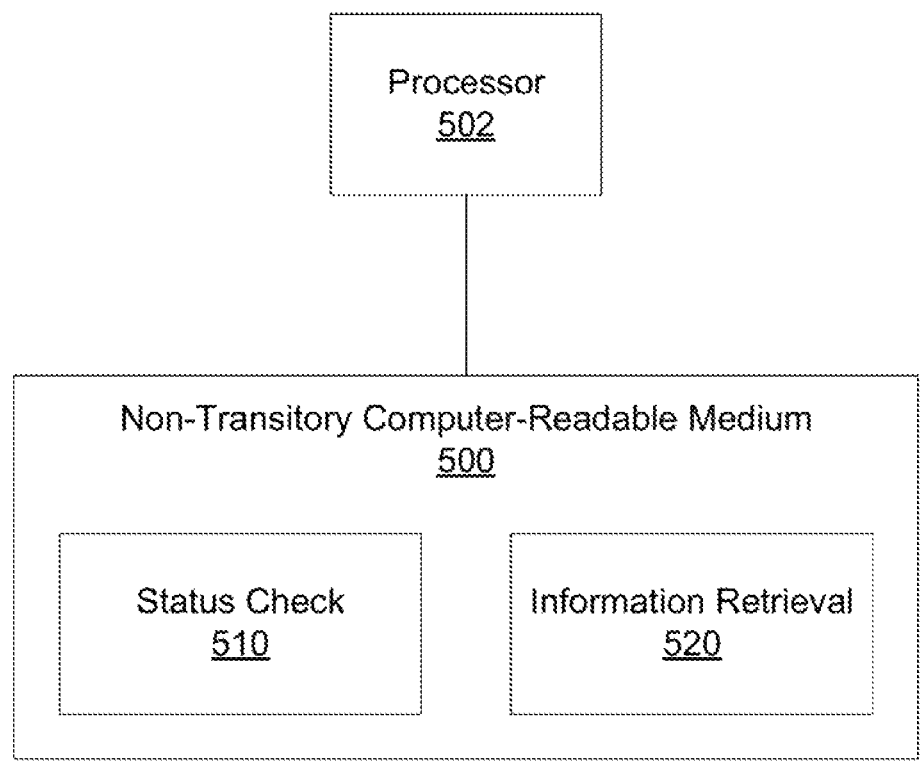
FIG. 5 is a block diagram of an example computer-readable medium including instructions that cause a processor to retrieve information about connected devices.

FIG. 5 is a block diagram of an example computer-readable medium 500 including instructions that, when executed by a processor 502, cause the processor 502 to retrieve information about connected devices. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor, a digital signal processor, a microcontroller, an ASIC, an FPGA, a PAL, a PLA, a PLD, etc.

The computer-readable medium 500 may include a status check module 510. As used herein, a "module" (in some examples referred to as a "software module") is a set of instructions that when executed or interpreted by a processor or stored at a processor-readable medium realizes a component or performs a method. The status check module 510 may include instructions that cause the processor 502 to check a status bit of a controller included in a peripheral interface. The status check module 510 may cause the processor 502 to check the status bit without previously requesting information from the controller of the peripheral interface. For example, the status bit may indicate that information is available to be read from the controller, but the processor 502 may not have previously indicated to the controller that the controller should retrieve that information.

The computer-readable medium 500 may also include an information retrieval module 520. The information retrieval module 520 may cause the processor 502 to retrieve information about a plurality of devices connected to the peripheral interface. In some examples, the information retrieval module 520 may cause the processor 502 to retrieve the information from the controller. The information retrieval module 520 may cause the processor 502 to retrieve the information based on the status bit being set. For example, the status bit may indicate that the information is ready to be retrieved by the processor 502. When executing the instructions of the status check module 510 or the information retrieval module 520, the processor 502 may realize the processor 110 of FIG. 1, for example.

Figure 6:
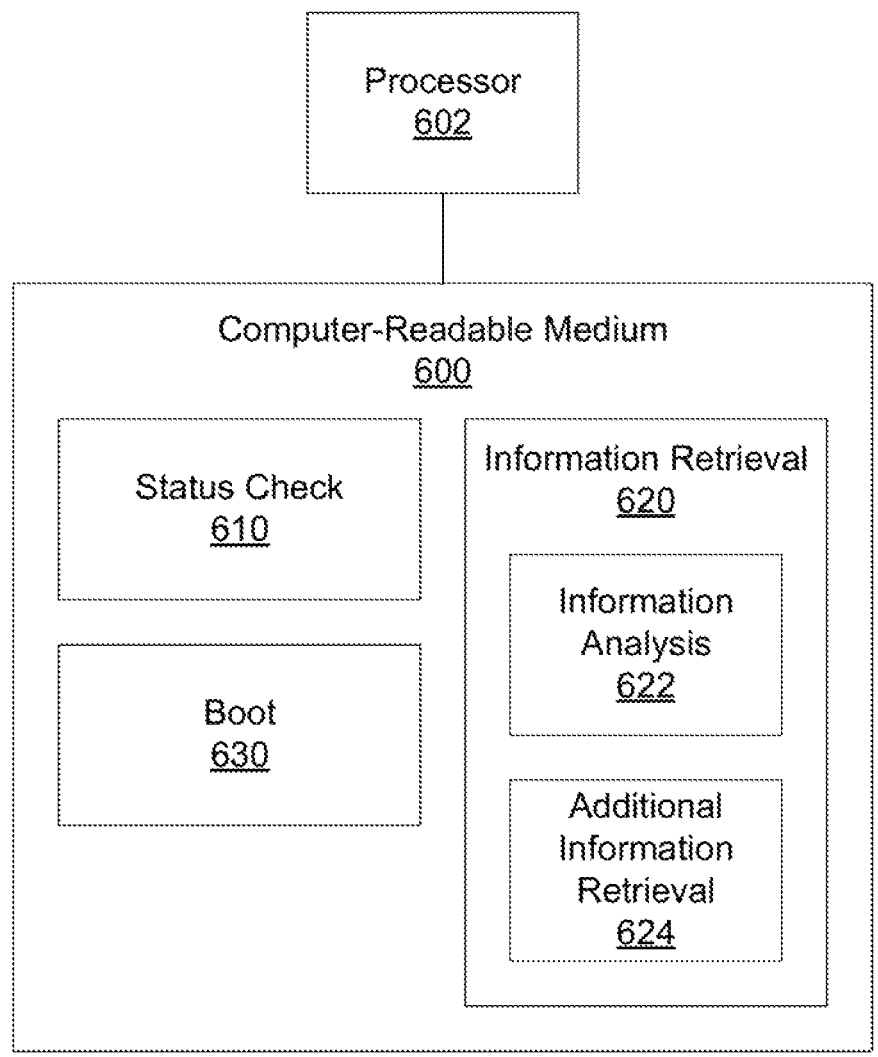
FIG. 6 is a block diagram of another example computer-readable medium including instructions that cause a processor to retrieve information about connected devices.

FIG. 6 is a block diagram of another example computer-readable medium 600 including instructions that, when executed by a processor 602, cause the processor 602 to retrieve information about connected devices. The computer-readable medium 600 may include a boot module 630. The boot module 630 may include instructions that cause the processor 602 to boot a computer system. For example, the boot module 630 may cause the processor 602 to initialize components of the computer system, such as the memory, peripherals, etc. In some examples, a controller included in a peripheral interface (not shown) may gather information from devices connected to the peripheral interface. The boot module 630 may not cause the processor 602 to communicate with the controller before the controller begins gathering the information. Rather, the boot module 630 may cause the processor 602 to boot the computer system and initialize components of the computer system in parallel with the controller gathering the information. The controller may automatically gather the information without input from the processor 602.

The computer-readable medium 600 may include a status check module 610. The boot module 630 may cause the processor 602 to reach a state where the processor 602 is ready to receive the information for the connected devices. In an example, when the boot module 630 and processor 602 are ready, the boot module 630 may cause the processor 602 to initialize an SMM handler, which may comprise the status check module 610. The status check module 610 may cause the processor 602 to check a status bit of the controller. In some examples, the first time the processor 602 communicates with the controller is when the processor 602 checks the status bit. To check the status bit, the status check module 610 may cause the processor 602 to request the status bit from the controller. The controller may transmit the status bit to the processor 602, and the status check module 610 may cause the processor 602 to receive the status bit. The status bit may indicate whether the controller has completed gathering the information from the connected devices. For example, the status bit may be set after the controller has completed everything necessary to gather the information, compress the information, and store the information in the appropriate location.

The status check module 610 may cause the processor 602 to evaluate the status bit that the processor 602 receives from the controller. The status check module 610 may cause the processor 602 to determine whether the status bit indicates the information is ready to be retrieved or if the status bit indicates the information is not ready. If the information is not ready, the status check module 610 may cause the processor 602 check the status bit until the status bit indicates the information is ready. For example, the status check module 610 may cause the processor 602 to check the status bit continuously, periodically, aperiodically, or the like. If the information is ready, the status check module 610 may cause the processor 602 to proceed to retrieving the information.

The computer-readable medium 600 may include an information retrieval module 620. For example, the SMM handler may comprise the information retrieval module 620. The status check module 610 may cause the processor 602 to begin execution of the information retrieval module 620 based on the status bit being set. The information retrieval module 620 may cause the processor 602 to retrieve, from the controller, the information about the plurality of devices connected to the peripheral interface. For example, the information retrieval module 620 may cause the processor 602 to request the information from the controller via a super I/O and to receive the information in a response from the controller.

The information retrieval module 620 may cause the processor 602 to retrieve the information from the controller one device at a time. The information retrieval module 620 may include an information analysis module 622. After the information retrieval module 620 causes the processor 602 retrieve the information for each connected device, the information analysis module 622 may cause the processor 602 to determine whether the information indicates that device was detected. For example, the information for each device may include a bit that indicates whether a device was detected. The information analysis module 622 may cause the processor 602 to determine whether the bit is set. If the bit is not set, the information analysis module 622 may cause the processor 602 to determine that information should not be retrieved for another device. If the bit is set, the information analysis module 622 may cause the processor 602 to determine that information for the next device should be retrieved unless the maximum number of devices has been reached. The information retrieval module 620 may cause the processor 602 to retrieve information for the next device if the processor 602 determines that the information should be retrieved.

In some examples, the information analysis module 622 may cause the processor 602 to determine whether additional information about a particular connected device should be retrieved. For example, the information analysis module 622 may cause the processor 602 to analyze the previously retrieved information for that device and determine whether additional information is needed to initialize that device or finish booting. Alternatively, or in addition, the boot module 630 may cause the processor 602 to determine whether additional information is needed. The information retrieval module 620 may include an additional information retrieval module 624. Based on a determination that additional information should be retrieved, the additional information retrieval module 624 may cause the processor 602 to request the additional information from the controller. The controller may gather the requested additional information from the connected device indicated in the request. The controller may transmit the additional information to the processor 602, and the additional information retrieval module 624 may cause the processor 602 to receive the additional information. The boot module 630 may cause the processor 602 to initialize the connected devices based on the retrieved information or additional information, and the boot module 630 may cause the processor 602 to complete booting of the computer system.

In some examples, the processor 602 may receive an interrupt from the controller, or the status check module 610 may cause the processor 602 to determine that a status bit has been set. The status check module 610 may cause the processor 602 to determine based on the interrupt, the set status bit, or the like that anew device has been connected. For example, the device may have been connected after the computer system has booted or after the information has been retrieved from the controller. Based on the determination that the new device has been connected, the information retrieval module 620 may cause the processor 602 to retrieve information for the newly connected device. In some examples, the information analysis module 622 may cause the processor 602 to determine additional information should be retrieved for the newly connected device, and the additional information retrieval module 624 may cause the processor 602 to retrieve the additional information. Based on the information or additional information, the boot module 630 may cause the processor 602 to initialize the newly connected device. Referring to FIG. 2, the processor 602 may realize, for example, the processor 210 when executing the instructions of the status check module 610, the information retrieval module 620, or the boot module 630.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
a processor;
a peripheral interface comprising a controller communicatively coupled to the processor, the controller to:
transmit a request for information to a plurality of devices connected to the peripheral interface prior to the processor requesting the information;
receive the information from the plurality of devices in response to the request transmitted to the plurality of devices, wherein the controller is to store the information in a compressed form; and
provide the information to the processor, wherein the information provided to the processor is the compressed form of the information.

2. The system of claim 1, wherein to provide the information, the controller is to store the information in the compressed form in a storage location accessible to the processor.

3. The system of claim 1, wherein the processor is to execute boot instructions, and wherein the boot instructions when executed cause the processor to retrieve the information.

4. The system of claim 3, wherein the boot instructions are to cause the processor to initialize system components in parallel with the controller sending the request to the plurality of devices, and wherein the boot instructions are to cause the processor to initialize a handler to retrieve the information.

5. The system of claim 1, wherein the controller is to request the information in response to initially receiving power.

6. A method, comprising:
powering on a peripheral interface comprising a controller;
in response to the powering on, the controller retrieving information about a plurality of devices connected to the peripheral interface prior to communication with a central processing unit, the controller retrieving the information about the plurality of devices by transmitting a request to each of the plurality of devices and receiving the information in response to the request transmitted to each of the plurality of devices;
the controller storing the information in a location accessible to the central processing unit, wherein storing the information comprises storing the information in a compressed format; and
providing the information in the compressed format to the central processing unit.

7. The method of claim 6, further comprising setting a status bit to indicate to the central processing unit that the information is ready to be read.

8. The method of claim 6, wherein the request is transmitted over a configuration channel to each of the plurality of devices.

9. The method of claim 6, wherein retrieving the information about the plurality of devices comprises detecting a presence of each device of the plurality of devices, and transmitting the request to each of the plurality of devices in response to detecting the presence.

10. A non-transitory computer-readable medium comprising instructions that, when executed by a processor, cause the processor to:
check a status bit of a controller without previously requesting information from the controller, wherein a peripheral interface comprises the controller, and wherein the controller is to set the status bit prior to the processor requesting information from the controller; and
based on the status bit being set, retrieve, from the controller, information in a compressed form about a plurality of devices connected to the peripheral interface, the information retrieved by the controller from the plurality of devices in response to the controller sending a request to each of the plurality of devices and storing the information in the compressed form.

11. The non-transitory computer-readable medium of claim 10, wherein the instructions cause the processor to retrieve information about each device of the plurality of devices in turn until the processor receives information indicating a device is not present.

12. The non-transitory computer-readable medium of claim 10, wherein the instructions cause the processor to retrieve additional information about a connected device based on the information previously retrieved.

13. The non-transitory computer-readable medium of claim 10, wherein the instructions cause the processor to, based on a device being newly connected after the retrieving of the information, retrieve information from the controller about the newly connected device.

14. The non-transitory computer-readable medium of claim 10, wherein the instructions cause the processor to boot while the controller collects the information from the plurality of devices.

15. The system of claim 1, wherein the controller is to transmit the request comprising a plurality of messages sent to respective devices of the plurality of devices.

16. The system of claim 1, wherein the controller is to transmit the request over a configuration channel to the plurality of devices.

17. The system of claim 1, wherein the controller is to transmit the request for the information to the plurality of devices without receiving an indication from the processor to obtain the information from the plurality of devices.

18. The system of claim 1, wherein the controller is to detect presence of the plurality of devices connected to the peripheral interface, and in response to detecting the presence of the plurality of devices connected to the peripheral interface, transmit the request to the plurality of devices.

* * * * *